(12) United States Patent
Hayashi

(10) Patent No.: US 8,348,033 B2
(45) Date of Patent: Jan. 8, 2013

(54) IMPACT-ABSORBING MEMBER

(75) Inventor: Kentaro Hayashi, Nagoya (JP)

(73) Assignee: Nippon Sharyo, Ltd., Aichi (JP)

( * ) Notice: Subject to any disclaimer, the term of this patent is extended or adjusted under 35 U.S.C. 154(b) by 307 days.

(21) Appl. No.: 12/591,579

(22) Filed: Nov. 24, 2009

(65) Prior Publication Data
US 2010/0126813 A1     May 27, 2010

(30) Foreign Application Priority Data

Nov. 25, 2008   (JP) ................................. 2008-299009

(51) Int. Cl.
*F16F 7/12* (2006.01)
(52) U.S. Cl. ........................................ 188/377; 293/110
(58) Field of Classification Search .................. 188/377, 188/371, 376; 293/120, 110
See application file for complete search history.

(56) References Cited

U.S. PATENT DOCUMENTS

| 3,997,207 A | * | 12/1976 | Norlin | 293/110 |
| 5,425,561 A | * | 6/1995 | Morgan | 293/120 |
| 7,516,993 B2 | * | 4/2009 | Bouchez et al. | 293/120 |

FOREIGN PATENT DOCUMENTS

| JP | 09240393 A | * | 9/1997 |
| JP | 2002-316642 A | | 10/2002 |
| JP | 2007-326550 A | | 12/2007 |

* cited by examiner

*Primary Examiner* — Melanie Torres Williams
(74) *Attorney, Agent, or Firm* — Edwards Wildman Palmer LLP; James E. Armstrong, IV; George N. Chaclas

(57) ABSTRACT

The impact absorbers having different lengths are formed by providing notches in one of opposed surfaces on front end side in a collision direction of a square pipe having a square in cross section. The three impact absorbers are disposed in a width direction while two impact absorbers are disposed in a height direction such that directions of the notches differ from each other, and the impact absorbers are disposed in integrally welded to form the impact-absorbing member.

7 Claims, 3 Drawing Sheets

IMPACT-ABSORBING MEMBER

BACKGROUND OF THE INVENTION

1. Field of the Invention

The present invention relates to an impact-absorbing member, for example, to an impact-absorbing member that absorbs an impact of a railway vehicle during a collision to reduce the impact applied to a passenger, a crew, and a railway vehicle.

2. Description of the Related Art

In the railway vehicle or monorail, an impact-absorbing member is provided in a front-back direction of a vehicle body. During the collision, the impact-absorbing member receives a collision impact to buckle a wall surface in a bellows manner, thereby absorbing collision energy. For example, Japanese Patent Application Laid-Open No. 2002-316642 discloses an impact-absorbing member in which the impact absorbers are buckled in the bellows manner during the collision by notching one of sides in a front end portion in a collision direction of the impact absorber formed by a hollow square material. Japanese Patent Application Laid-Open No. 2007-326550 also discloses an impact-absorbing member in which plural impact absorbers are joined while positions of front end surfaces in the collision direction are displaced, and thereby shifting the time the impact absorber start crush during the collision.

However, in the conventional impact-absorbing member, sometimes the impact absorber bends in two from an intermediate portion and buckles into a V-shape during the collision, and there is a risk of insufficiently absorbing the impact. Further, in the impact-absorbing member disclosed in Japanese Patent Application Laid-Open No. 2007-326550, because plural impact absorbers having different length and thicknesses are amounted on a vehicle body, unfortunately the structure becomes complicated to increase cost.

SUMMARY OF THE INVENTION

An object of the invention is to provide an impact-absorbing member that can successfully absorb impact energy by continuously generating buckling distortions of impact absorbers in the bellows manner with a simple structure during the collision.

In accordance with an aspect of the invention, an impact-absorbing member that absorbs impact energy by sequentially buckling in a bellows manner from a front end in a longitudinal direction toward a base end by an impact load applied to the front end, wherein notches are provided to form an impact absorber at front end edges in one set of opposed surfaces in two sets of opposed surfaces opposed to each other at a front end of a square pipe having a square shape in cross section, at least four impact absorbers are arrayed in a width direction and a height direction, and the impact absorbers are disposed such that the notches of the adjacent impact absorbers are different from each other in a direction. In the impact-absorbing member in accordance with the aspect of the invention, preferably the adjacent impact absorbers are joined. In the impact-absorbing member in accordance with the aspect of the invention, preferably, in the plural impact absorbers, at least one impact absorber is formed so as to be different from other impact absorbers in a length and a position of a front end edge.

Accordingly, in the impact-absorbing member of the aspect of the invention, because the notches are provided at the front end edge of a square pipe having the square shape in cross section, the opposed surfaces in which the notches are not provided in each impact absorber is initially subject to the impact during the collision, the wall surface portions of the opposed surfaces start the deformation, and a deformation force propagates to the wall surface on the base end side or the adjacent wall surface. Because at least four impact absorbers are joined such that the directions of the notches differ from each other, the wall surface that is adjacent to the wall surface deforming outward deforms inward, and the deformations of adjacent surfaces are continuously repeated while affecting each other. Therefore, the wall surface of each impact absorber can continuously buckle in the bellows manner. Further, at least four impact absorbers are disposed and joined in the width direction and height direction, so that bending rigidity can be enhanced to prevent the bending of the impact absorber in the intermediate portion.

The square pipes in which the notches are provided at one end to constitute the impact absorber, are arrayed to form the impact-absorbing member, so that the number of components can be decreased to reduce component cost and production cost.

The crushes of the impact absorbers start at different times during the collision by the combination of the impact absorbers having the different lengths, so that a load peak of the whole can be lowered to relieve the impact on the passenger, crew, and vehicle body.

DESCRIPTION OF THE PREFERRED EMBODIMENT

Figure 1:
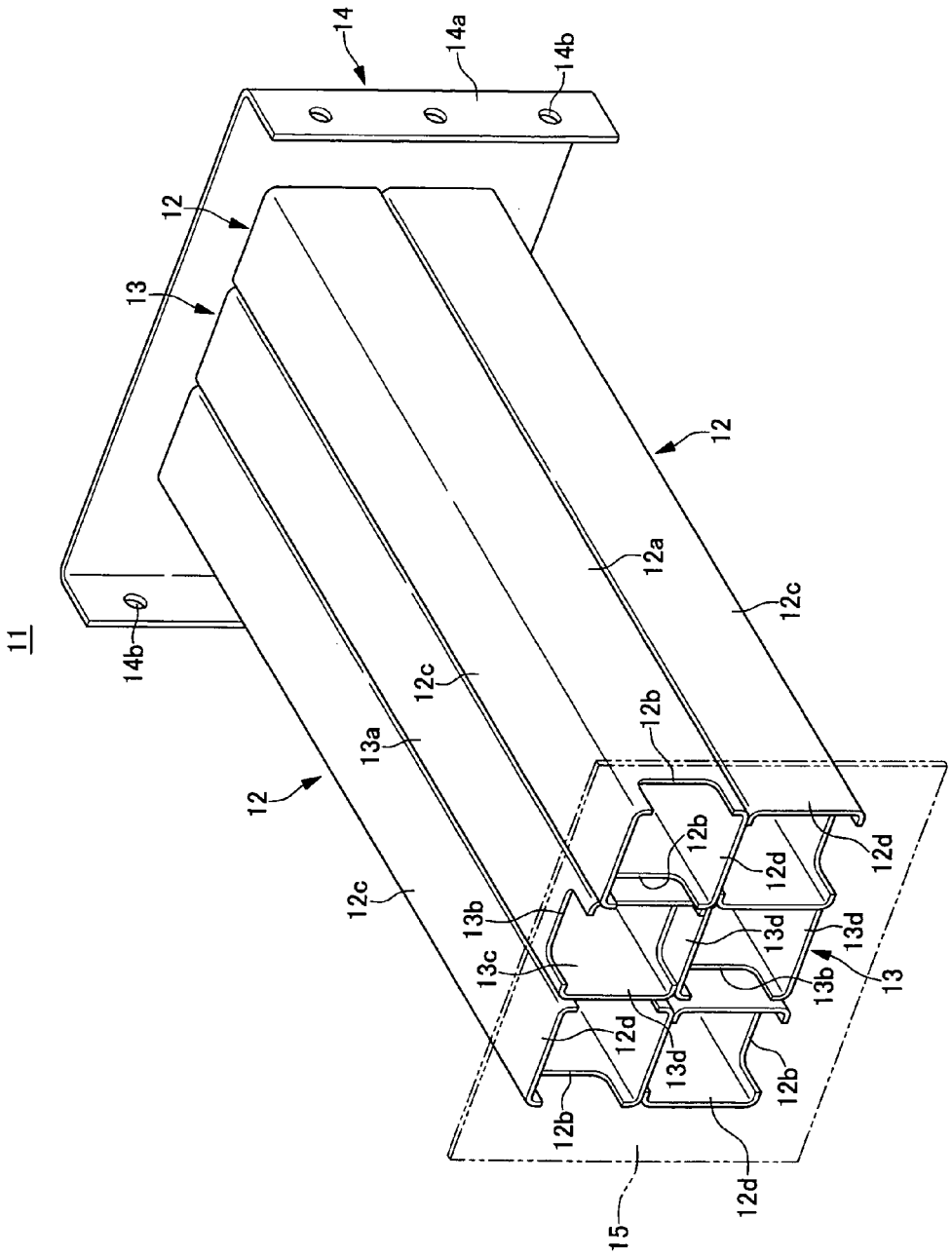
FIG. 1 is a perspective view illustrating an impact-absorbing member according to an embodiment of the invention.
Figure 2:
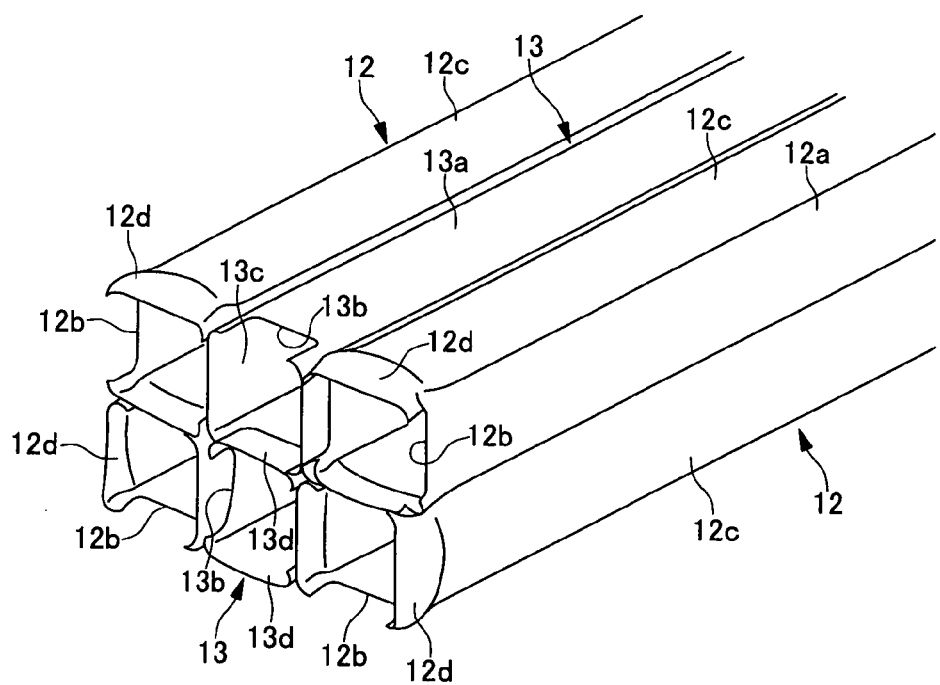
FIG. 2 is a perspective view illustrating a state in which the impact-absorbing member of the embodiment starts the buckling at the beginning of the collision.
Figure 3:
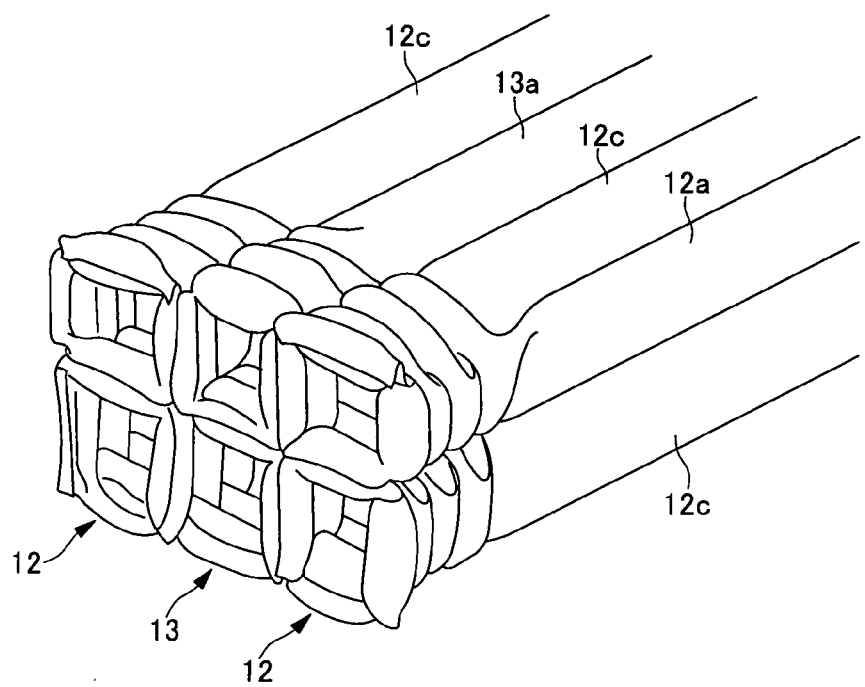
FIG. 3 is a perspective view illustrating a state in which the impact-absorbing member of the embodiment buckles in a bellows manner.
Figure 4:
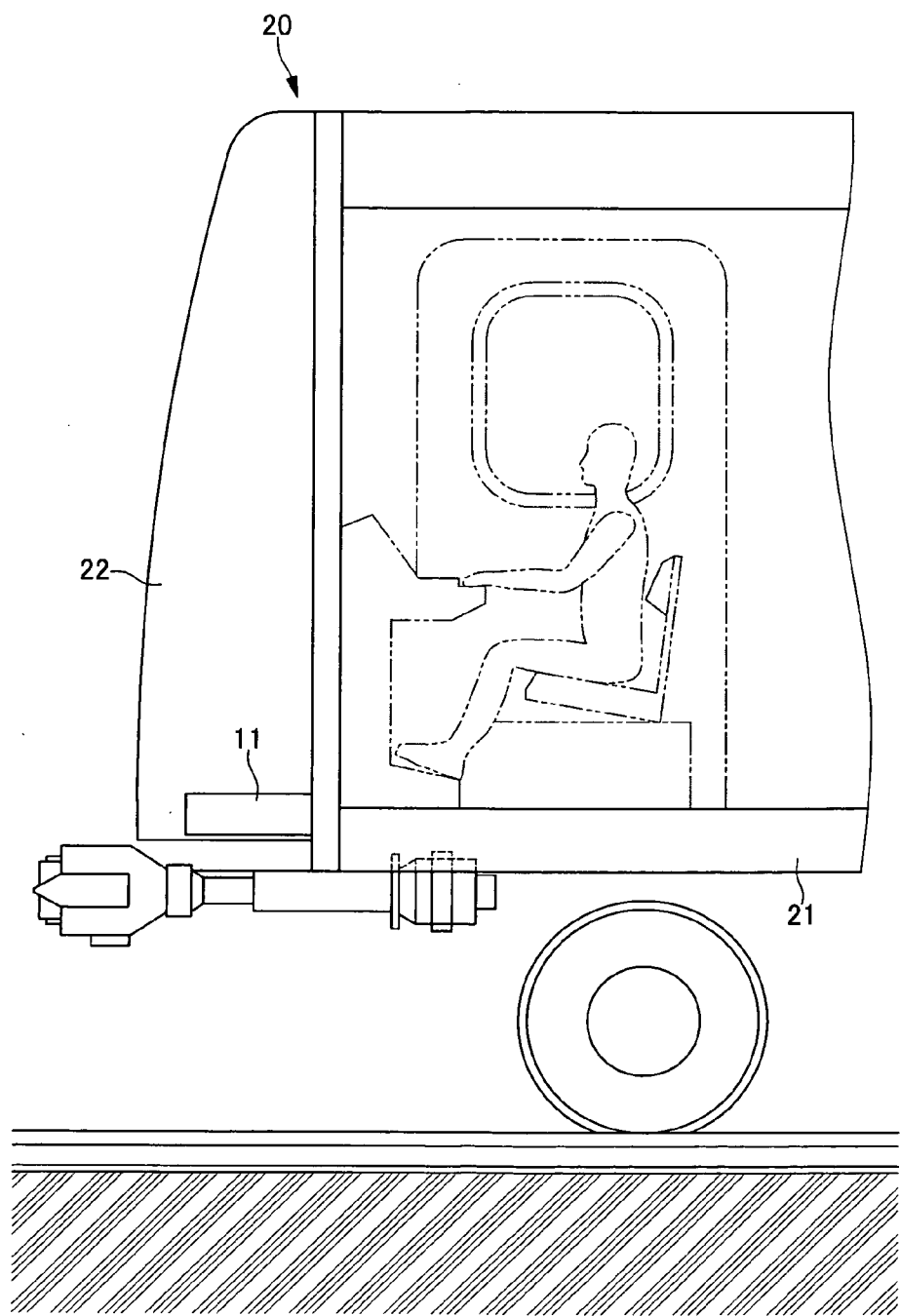
FIG. 4 illustrates a state in which the impact-absorbing member of the embodiment is mounted on a front vehicle.

FIGS. 1 to 4 illustrate an impact-absorbing member according to an embodiment of the invention, FIG. 1 is a perspective view of the impact-absorbing member, FIG. 2 is a perspective view illustrating a state in which the impact-absorbing member starts the buckling at the beginning of the collision, FIG. 3 is a perspective view illustrating a state in which the impact-absorbing member buckles in a bellows manner, and FIG. 4 illustrates a state in which the impact-absorbing member is mounted on a head portion of a railway vehicle.

For example, as illustrated in FIG. 4, an impact-absorbing member 11 is mounted on a front portion of a front vehicle 20 of a railway vehicle so as to be projected forward from an underframe 21. The impact-absorbing member 11 absorbs the collision energy during the collision to reduce the impact on the passenger, crew, and vehicle body.

The impact-absorbing member 11 is formed by a combination of four long impact absorbers 12 and two short impact absorbers 13. The impact absorbers 12 and 13 are formed by square pipes having the same square in cross section, for example, general-purpose square steel pipes. The impact absorbers 13 are shorter than the impact absorbers 12. The four long impact absorbers 12 are disposed on outsides in a width direction of a vehicle body, and the two short impact absorbers 13 are disposed in a central portion in the width direction. Each three impact absorbers 12 and 13 are disposed in the width direction of the vehicle body, and each two impact absorbers 12 or 13 are disposed in a height direction of the vehicle body. In the six impact absorbers 12 and 13, the adjacent impact absorbers 12 and 13 are integrated by appropriate joining means, for example, intermittent welding, and a mounting plate 14 is mounted on a base portion in order to mount the impact-absorbing member 11 on the underframe 21. The mounting plate 14 includes mounting pieces 14a and 14a in both side portions in the width direction of the vehicle body, and plural bolt holes 14b are made in the mounting pieces 14a and 14a. The mounting pieces 14a and 14a bend toward a forward impact absorber side.

In each of the impact absorbers 12 and 13, notches 12b, 12b, 13b, and 13b are provided at a front end edge of one set of opposed surfaces 12a, 12a, 13a, and 13a in two sets of opposed surfaces, and a front end edge of the other set of opposed surfaces 12c, 12c, 13c, and 13c constitutes opposed projection surfaces 12d, 12d, 13d, and 13d that are projected forward from the notches 12b, 12b, 13b, and 13b, that is, in the collision direction. The six impact absorbers 12 and 13 are combined and disposed such that directions of the notches 12b, 12b, 13b, and 13b adjacent to each other in the width direction and height direction are different from each other. The opposed projection surfaces 12d and 12d of the impact absorber 12 disposed on the outsides in the width direction of the vehicle body are projected forward from the opposed projection surfaces 13d and 13d of the impact absorber 13 disposed in the central portion in the width direction of the vehicle body.

The impact-absorbing member 11 is mounted on the front edge of the underframe 21 by plural mounting bolts piercing through the bolt holes 14b, and the impact absorbers 12 and 13 are horizontally disposed so as to be projected forward. A front mounting plate 15 joined to a front head cover 22 may be mounted on the front edge of the impact-absorbing member 11 as needed.

When the front vehicle 20 is subject to the collision impact, the opposed projection surfaces 12d and 12d of the long impact absorber 12 are subject to the impact in a direction of axis. At this point, because the notches 12b and 12b are provided in the surfaces adjacent to the opposed projection surfaces 12d and 12d, the opposed projection surfaces 12d and 12d deform such that the intermediate portions of the opposed projection surfaces 12d and 12d swell outward as illustrated in FIG. 2. Similarly, in the short impact absorber 13, the opposed projection surfaces 13d and 13d deform outward when being subject to the impact.

When the opposed projection surfaces 12d and 13d deform outward, a force in a direction in which the inward deformation is generated acts on a wall surface on a base end side in the deformed portion of each of the opposed projection surfaces 12d and 13d. At this point, when bottom portions of the notches 12b and 13b are subject to the impact, as described above, because the force in the direction in which the inward deformation is generated acts on the wall surface on the base end side of each of the adjacent opposed projection surfaces 12d and 13d, the wall surface on the base end side of each of the notches 12b and 13b deforms so as to swell outward.

That is, in each of the impact absorbers 12 and 13, when the wall surfaces vertically opposed to each other deform so as to swell outward, the wall surfaces opposed to each other in the width direction deform so as to swell inward. Further, when the front wall surface deforms so as to swell outward, the wall surface on the rear portion side (base end side) thereof deforms so as to swell inward, and therefore the wall surface buckles in the bellows manner. In the adjacent impact absorbers 12 and 13, for example, when the wall surfaces opposed to each other in the vertical direction of the impact absorber 12 deform so as to swell outward, because the wall surfaces opposed to each other in the width direction deform so as to swell inward, the wall surfaces opposed to each other in the width direction of the adjacent impact absorber 13 deform so as to swell outward, and the wall surfaces opposed to each other in the vertical direction deform so as to swell inward.

Thus, the impact absorbers 12 and 13 are disposed such that the adjacent impact absorbers are different from each other in the directions of the notches 12b and 13b of the impact absorbers 12 and 13 in the width direction and height direction. When a dimensional difference between the long impact absorber 12 and the short impact absorber 13 and depths of the notches 12b and 13b provided in the impact absorber 12 and 13 are properly set, the bellows-shaped deformations of the wall surfaces in the impact absorbers 12 and 13 joined by welding affect each other to continuously generate the series of deformations, so that the impact absorbers 12 and 13 can continuously buckle in the bellows manner to the base end portion as illustrated in FIG. 3.

Further, in the impact-absorbing member 11, because the adjacent impact absorbers 12 and 13 are integrally joined, bending rigidity of the impact-absorbing member 11 is enhanced, and the impact absorber does not bend in two from the intermediate portion nor buckle into the V-shape during the collision. Therefore, the impact absorber can securely buckle in the bellows manner to effectively absorb the impact.

A collision load acts sequentially on the front end edges of the opposed projection surfaces 12d and 13d and the bottoms of the notches 12b and 13b, so that the collision load can be dispersed only when the notches 12b and 13b are provided. Because the deformations of the impact absorbers 12 and 13 start at different times during the collision by the combination of the impact absorbers 12 and 13 having the different lengths, a load peak can more effectively be dispersed to lower the load peak of the whole, and the impact on the passenger, crew, and vehicle body can further be reduced. Further, the impact absorbers 12 and 13 are formed by the general-purpose square steel pipe having the same dimensions, so that the cost reduction and weight reduction can be achieved as a whole.

In the embodiment, the impact-absorbing member is formed by the combination of the six impact absorbers having the different lengths, but the impact-absorbing member of the invention is not limited thereto. Alternatively, for example, the impact-absorbing member formed by the combination of the impact absorbers having the same length can successfully absorb the collision impact. The whole of the adjacent impact absorbers is not joined, but the adjacent impact absorbers may partially be joined.

The material and dimensions of the impact absorber are arbitrarily set. For example, a hollow aluminum extruded material may be used, and the impact absorbers having different wall thicknesses may be combined as long as the impact absorbers have the same outer surface size. The number of impact-absorbing members may be selected according to the material, dimensions, and a necessary impact-absorbing force. The number of impact-absorbing members may be set to at least four, and at least two impact absorbers may be disposed in the width direction and height direction. The point at which the impact-absorbing member is mounted may be selected according to the intended use. For example, in the railway vehicle, the impact-absorbing member may be mounted on a jointing surface except for the head portion. The impact-absorbing member can be applied to various applications in which the collision load acts in the direction of axis (longitudinal direction) of the impact absorber.

What is claimed is:

1. An impact-absorbing member that absorbs impact energy, the impact-absorbing member comprising:
   a plurality of square pipes defining notches to form an impact absorber at front end edges in a front end of each square pipe, at least four square pipes are arrayed in a width direction and a height direction in a two-by-two manner, and the square pipes are disposed such that the notches of the adjacent square pipes are different from each other in orientation such that upon a collision impact load being applied to the front end, the impact absorber sequentially buckles in a bellows manner from the front ends in a longitudinal direction toward a base end.

2. The impact-absorbing member according to claim 1, wherein the adjacent impact absorbers are joined.

3. The impact-absorbing member according to claim 1, wherein, in the plurality of impact absorbers, at least one impact absorber is formed so as to be different from other impact absorbers in a length and a position of a front end edge.

4. The impact-absorbing member according to claim 2, wherein, in the plurality of impact absorbers, at least one impact absorber is formed so as to be different from other impact absorbers in a length and a position of a front end edge.

5. An impact-absorbing member comprising:
   at least four tubes, each tube having four sidewalls that extend between a first end and a second end, the first end having two opposing sidewalls that terminate in projection surfaces and two opposing sidewalls that define notches; and
   a mounting plate having the second ends of the tubes coupled thereto,
   wherein: the at least four tubes are coupled in at least two columns and two rows with adjacent sidewalls so that the opposing notches are arranged and oriented such that at least one notch of each tube is against at least one projection of the adjacent tube to at least partially cover the respective notch.

6. The impact-absorbing member according to claim 5, wherein the at least four tube is four long tubes and two relatively shorter tubes,
   wherein: the long and short tubes are coupled in three columns and two rows so that the two short tubes make up a center column of the three columns with the first ends of the long tubes extending away from the mounting plate further than the first ends of the short tubes; and
   the opposing notches are arranged and oriented such that when the notches are adjacent another tube, the notches are against a projection surface of the another tube.

7. The impact-absorbing member according to claim 5, wherein the at least four tubes have square cross-sectional shapes.

* * * * *